March 21, 1939.  R. A. HAWN  2,151,205
CERAMIC DRILL
Filed May 28, 1936
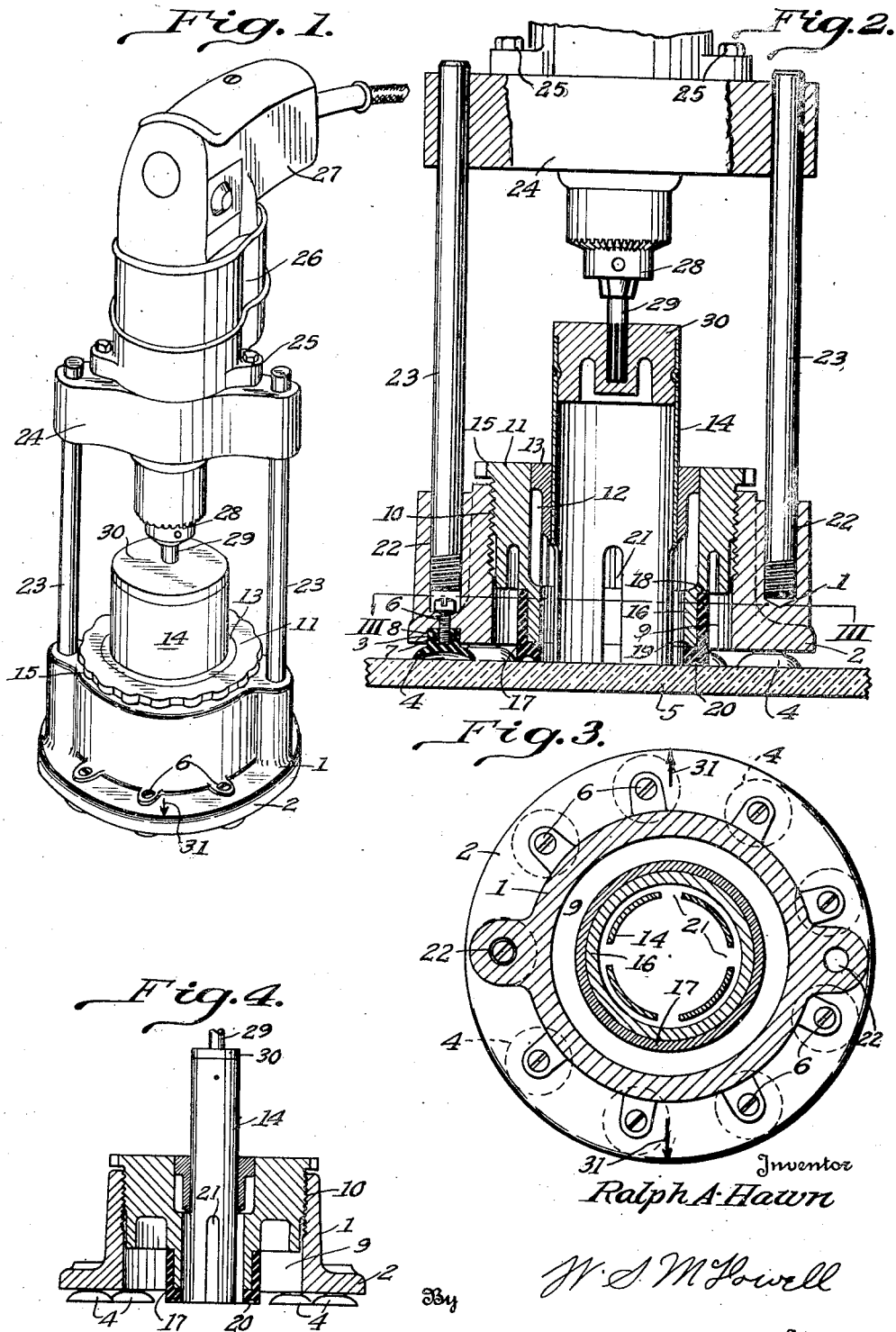
Inventor
Ralph A. Hawn
By W. S. McDowell
Attorney Patented Mar. 21, 1939

2,151,205

UNITED STATES PATENT OFFICE 2,151,205

CERAMIC DRILL

Ralph A. Hawn, Columbus, Ohio

Application May 28, 1936, Serial No. 82,301

16 Claims. (Cl. 125—20)

This invention relates to drilling tools, and more particularly to an improved, motor driven tubular drilling tool adapted for cutting or drilling holes in glass, marble, porcelain, slate, stone, tile and ceramic materials generally, such as terrazzo flooring or the like.

The primary object of the invention resides in the provision of a light, compact, portable ceramic drill in either vertical or horizontal positions, or in other planes perpendicular to the surface to be drilled, and wherein the drill holder, in which the tubular cutting drill is supported for rotation, has its work abutting face provided with an annularly arranged row of suction-producing cups of rubber, or other similar deformable material, so that the drill, including its operating motor, may, by the use of the suction cups, be directly attached whenever desired to the outer surface of the material to be drilled, without involving any extraneous means of support, in a quick and effective manner and without injury to the material operated upon.

Another object of the invention resides in providing the drill holder or guide with spaced parallel longitudinally extending rods adapted for the slidable reception of a cross head upon which is carried the electrically actuated driving motor for the tubular cutting drill, the said rods, in combination with the guide holder, serving to maintain said motor and the associated drill in interconnected operative relationship, so that the drill will be supported for rotation about a fixed longitudinal axis and prevented from deviating from such axis when in operation.

A further object of the invention resides in providing the holder or drill guide with an internal socket adapted for the reception of any one of a plurality of adapter rings, the latter being formed for the rotatable reception of tubular drills of varying diameter, provision being made for quickly and readily removing or inserting an adapted ring from or in said holder in order to permit of the drilling of openings of varying diameter.

Another object of the invention resides in providing each of the adapter rings with a removable work-engaging gasket having a suction producing groove formed therein, the said gasket serving to assist the suction-producing cups in maintaining the tool in engagement with the work without the use of extraneous supports or positioning elements and, also, to act as a seal in preventing the escape of a fluid abrasive employed in connection with the operation of the tubular drill.

A still further object of the invention resides in the provision of a tubular drill for producing circular openings in ceramic bodies and wherein the cutting drum portion of the drill is formed with longitudinally extending slots, producing cutting edges, the slotted portion of the drill being maintained in spaced relationship from the adjacent inner walls of the adapter ring in which the drill is rotatably mounted, whereby to provide for the free flow of the abrasive about the inner and outer surfaces of the slotted portion of the drill, and yet to confine the abrasive to the immediate vicinity of the cutting edges of the drill, where it may be most advantageously utilized.

For a further understanding of the invention, reference is to be had to the following description and the accompanying drawing, wherein:

Fig. 1 is a perspective view of a ceramic drill constructed in accordance with the present invention;

Fig. 2 is a vertical sectional view taken through the drill;

Fig. 3 is a horizontal sectional view on the plane indicated by the line III—III of Fig. 2;

Fig. 4 is a vertical sectional view taken through the drill but wherein a tubular cutter of smaller diameter than that shown in Fig. 2 is utilized.

Referring more particularly to the drawing, the numeral 1 designates the base member or holder of my improved ceramic drill which is preferably in the form of a casting and includes an annular base flange 2, having its inner or under surface formed with a plurality of sockets 3 adapted for the reception of a plurality of suction cups 4. These cups are preferably formed from rubber, or other similar deformable material which, when moistened, compressed and released, tenaciously adhere to the outer surface of a body to be drilled, such for instance, as a pane of glass, as indicated at 5. A sufficient number of the suction cups are used and their total area is such that the drill as a whole may be supported in any desired position, whether vertical, horizontal or otherwise, without involving extraneous means of support, such as clamps, frames or the like. This renders the drill self-contained and enables the same to be placed where desired on the surface of the material to be drilled. For instance, it is often desirable to drill openings in large panes of glass such as that employed in show windows. In accordance with the present invention, the drill may be placed on an installed or erected pane of glass in any desired position and an opening drilled in the glass without disturbing the mounting of the latter. This adaptability is due to the lightness in weight of the structural parts of the drill and to the strong and powerful grip which the suction cups exercise on the surface of the material to which the drill is attached. The cups 4 are preferably held in place by means of headed screws 6 which have their shanks received within nuts 7 embedded in the stems 8 of said cups. By tightening the screws 6, the said stems are firmly drawn into and held within the sockets 3 of the base flange.

The base member or holder 1 is, in this instance, formed with a longitudinally extending axially disposed opening 9 passing therethrough from end to end, the said opening being of substantially uniform diameter throughout its length or height. The upper or outer portion of the opening 9 is provided with screw threads as indicated at 10, which receive the threaded outer wall of an adapter ring 11. This ring, like the member or holder 1, is also formed from a cast or molded composition material, such as a resinous condensation product and is, in turn, provided with an axial opening 12 passing through the ring from one end thereof to the other. In the upper or outer end of the opening 12, there is stationarily positioned a metallic bushing or bearing 13 which closely engages and supports for rotation a tubular cutting drill 14. The upper or outer end of the ring 11 is formed with an out-turned flange 15 having a serrated edge, which enables the said last-named flange to be conveniently gripped in order to thread the ring into its operating position within the base member or holder 1 or to effect its removal from the latter.

The bottom or inner portion of the ring terminates in an annular skirt 16 and positioned upon the outer circular wall of this skirt is a sealing gasket 17. The upper or outer edge of the gasket 17 engages with a shoulder 18, formed at the upper or outer end of the skirt 16, while the lower or inner end of said gasket is thickened to form an annular shoulder 19 which engages with the lower or inner edge of the skirt 16. The thickened work-engaging portion of said gasket has its work engaging surface formed with an annular groove 20 which, when moistioned, compressed and released, supplements the action of the suction cups 4 in holding the tool on the work and, in addition, serves as a seal in preventing the escape of a substantially fluid abrasive compound from the immediate confines of the cutting drill 14.

Cutting drills of varying diameter are employed in conjunction with adapter rings conforming to such variations in drill diameter. For instance, as shown in Fig. 4, a tubular cutter or drill possesses a smaller diameter than that illustrated in Fig. 2. For all diameters, however, a constant distance is maintained between the drills and the skirts 16 of the adapter rings, whereby to provide for the free flow of the abrasive fluid or paste around both the inner and outer surfaces of the cutting end of the drill. In this instance, the cutting end of the drill is formed with a plurality of longitudinally extending, relatively spaced, open-ended slots 21, which produce the cutting edges. As the drill or cutter 14 revolves, the fluid abrasive compound is confined within the limits of the opening 12 of the adapter ring, first, by the construction of the ring itself, and, secondly, through the use of the gasket 17, thus confining the compound to the limits of the opening being drilled and preventing it from spreading over and marring contiguous surfaces.

The base member or holder 1 is formed with a pair of sockets 22 for the reception of the lower or inner ends of a pair of rigid guide rods 23. Removably and slidably mounted on these rods is a cross member or saddle 24 to which is secured as at 25 an electrical motor 26, the latter being preferably provided with a pistol grip 27 for convenience in the manual handling of the same. The armature shaft of the motor drives a chuck 28, which removably receives an axially disposed stem 29 fixed to the head 30 provided at the outer or upper end of each cutting drill 14.

In the use of the tool, the base member or holder 1 is first applied in the correct position on the material to be cut. Usually, the operator produces intersecting perpendicular lines on the surface of the material to indicate the center of the opening to be drilled. The upper surface of the base flange 2 may be provided with arrows, as indicated at 31, which may be registered with the lines drawn on the surface of the material. The suction cups, which have been previously moistened, are compressed and deformed so that when the holder is released, the said cups will exercise their maximum suction effect.

Following the positioning of the base member or holder 1, the proper size adapter ring is then threaded into the base member or holder, until the sealing gasket 13 thereof firmly engages the outer surface of the material to be cut. A fluid abrasive is then applied to the inside of the adapter ring and deposited on the material surface. Following this operation, the tubular cutter or drill of proper diameter is then connected with the chuck 28 of the operating motor, and the cross member or saddle 24, supporting said motor, is then placed on the upper ends of the guide rods 23 and advanced longitudinally thereon until the cutting edges of the drill 14 contact with the surface of the material to be cut. The switch governing the operation of the motor is then closed, starting the motor and rotating the drill.

Due to the provision of the bushing or bearing 13 in the adapter ring, and the steadying influence of the guide rods 23 and the cross member 24, which carries the motor, true rotation of the drill takes place about its longitudinal axis, so that perfectly straight openings may be bored in the material engaged by the drill. It is not necessary for the operator to hold the motor during the drilling operation, since the cutter and motor automatically advance as the drilling proceeds, particularly when the tool is arranged in the upright or vertical position disclosed in Fig. 2.

The present invention thus provides a light portable drill of a self-contained character adapted for rapidly and accurately producing circular openings in various kinds of ceramic materials.

What is claimed is:

1. A ceramic drill comprising a holder having an opening extending longitudinally therethrough, an adapter ring removably positioned in said holder, said ring constituting a bearing for the reception of a rotatable tubular cutter, a plurality of suction cups connected with the bottom of said holder, and a sealing gasket carried by the bottom of said adapter ring.

2. The combination with a drill, of a holder having securing means thereon engaging the work, an adapter ring carried by said holder, and compressible means on said adapter ring engaging said work.

3. The combination with a drill, of a holder having securing means thereon engaging the work, an adapter having a compressible work engaging member, and means for adjusting the adapter relative to the work and said holder.

4. The combination with a drill, of a base member having securing means thereon engaging the work, a drill adapter removably carried by said base member, and a work engaging compressible means on said adapter, said compressible means lying adjacent said drill and surrounding the same to prevent escape of abrasive from the area to be drilled.

5. The combination with a drill, of a base member, suction cups on said base member engaging the work, a drill adapter, compressible means on said adapter, and means connecting said adapter with said base member to press and hold said compressible means against said work.

6. The combination with a drill, of a base member, suction cups on said base member engaging the work, a drill adapter, compressible means on said adapter, and means connecting said adapter with said base member to press and hold said compressible means against said work, said compressible means lying adjacent to said drill and surrounding the same to prevent escape of abrasive from the area of the work undergoing drilling.

7. The combination with a drill, of a base member, suction producing means carried by said base member and engaging the work to maintain said member in attached relationship with the work, a drill receiving adapter, a cushion on said adapter, and means connecting said adapter with said base member to press said cushion against the work, said cushion being ring-like and lying adjacent to said drill in surrounding relation therewith.

8. The combination with a drill, of a base member, suction producing means carried by said base member and engaging the work to maintain said member in attached relationship with the work, a drill receiving adapter, a cushion on said adapter, and means connecting said adapter with said base member to press said cushion against the work, said cushion being ring-like and lying adjacent to said drill in surrounding relation therewith, said cushion having the work engaging surface thereof provided with an annular groove.

9. The combination with a drill, of a base member, an annular series of suction cups carried by said base member for engagement with the surface of a body to be drilled, a drill receiving adapter removable carried by said base member, an annular work engaging gasket carried by the inner end of said adapter, and a bushing formed with said adapter for the rotatable reception of a drill, said drill having a smaller diameter than said gasket.

10. The combination with a motor driven tubular drill, of an annular base member, an annular series of suction cups carried by said base member for supporting the latter on the surface of the material to be drilled independently of extraneous support, said base member being provided with an internally threaded opening, a drill-receiving adapter ring positioned in said opening and having threaded engagement therewith, said ring being provided with an annular skirt surrounding and spaced from the cutting end of said drill, and a compressible seal carried by said skirt.

11. A ceramic drill comprising a base member having a longitudinally extending opening formed therein, a drill receiving adapter removably positioned in said opening, a tubular drill rotatably supported by said adapter, said drill having the cutting end thereof longitudinally slotted, the outer surfaces of said drill at the slotted end thereof being spaced from the complemental inner surfaces of said adapter to produce an annular abrasive-receiving opening, and a compressible work engaging seal carried by the inner end of said adapter.

12. A ceramic drill comprising a base member, an adapter removably positioned within said base member, a tubular cutting drill rotatably supported by said adapter, longitudinally extending guides rigidly projecting from said base member, a saddle slidably mounted on said guides, and a motor for rotating said drill mounted on said saddle.

13. A ceramic drill comprising a base member, an adapter removably positioned within said base member, a tubular cutting drill rotatably supported by said adapter, longitudinally extending guides rigidly projecting from said base member, a saddle slidably mounted on said guides, and a motor for rotating said drill mounted on said saddle, said saddle being removable from the outer ends of said guides.

14. In a cutting device of the kind described, a holder provided with a bore therethrough; an insert having an opening therethrough positioned in the bore of the holder; gripping elements to secure the holder upon the surface of the work mounted on the holder; and a resilient skirt on the insert for setting off an area on the said surface.

15. In a cutting device of the kind described, a holder provided wtih a bore therethrough; an insert having an opening therethrough positioned in the bore of the holder; gripping elements to secure the holder upon the surface of the work mounted on the holder; and a resilient skirt on the insert for setting off an area on the said surface, said holder and insert being in screw-threaded engagement whereby upon manual manipulation of the latter the said skirt is forced against the surface of the work.

16. In a cutting device of the kind described, a holder having a bore extending therethrough; a plurality of suction cups arranged in a circumscribing path on the holder around the bore to secure the same to the work; an insert extending into the bore; screw threads formed on the said holder and insert whereby upon manual manipulation the latter is moved along the holder within the bore thereof; a resilient skirt on the insert movable toward and from the work; and a rotatable cutter journalled in the insert, said suction cups providing sufficient gripping force to permit the aforesaid manipulation of the insert to force its resilient skirt against the work an amount necessary to establish a sealed joint around the area set off by the said skirt.

RALPH A. HAWN.